United States Patent [19]

Fahrion

[11] Patent Number: 5,629,674
[45] Date of Patent: May 13, 1997

[54] DEVICE FOR MONITORING THE ALLEYWAYS BETWEEN SHELF UNITS IN A WAREHOUSE

[76] Inventor: Otmar Fahrion, Dürerstr. 9, 70806 Kornwestheim, Germany

[21] Appl. No.: 117,046

[22] PCT Filed: Mar. 21, 1992

[86] PCT No.: PCT/EP92/00628

§ 371 Date: Sep. 9, 1993

§ 102(e) Date: Sep. 9, 1993

[87] PCT Pub. No.: WO92/18803

PCT Pub. Date: Oct. 29, 1992

[30] Foreign Application Priority Data

Apr. 18, 1991 [DE] Germany ............... 41 12 728

[51] Int. Cl.⁶ ................................................. G08B 13/18
[52] U.S. Cl. .................... 340/556; 250/221; 250/222.1; 364/461; 377/6; 377/9; 381/56
[58] Field of Search ............... 340/556–57, 691–92, 340/541, 686, 435–36, 944, 935; 250/221, 222.1; 377/6, 9, 17, 24.2; 381/56; 364/424.02, 461; 367/909

[56] References Cited

U.S. PATENT DOCUMENTS

| 4,249,074 | 2/1981 | Zettler et al. ................. 340/556 X |
| 4,322,804 | 3/1982 | Evans ........................ 250/221 X |
| 4,754,266 | 6/1988 | Shand et al. ................. 340/691 |
| 4,804,860 | 2/1989 | Ross et al. ................. 340/556 X |
| 4,866,423 | 9/1989 | Anderson, II et al. ............. 340/541 |
| 5,011,358 | 4/1991 | Andersen et al. .............. 340/686 X |
| 5,298,738 | 3/1994 | Gebert et al. ................ 250/222.1 |

FOREIGN PATENT DOCUMENTS

| 0220361 | 5/1987 | European Pat. Off. . | |
| 3208901 | 9/1983 | Germany . | |
| 3919167 | 9/1990 | Germany . | |
| 233409 | 9/1988 | Japan ................ 340/556 |
| 1229100 | 5/1986 | U.S.S.R. ............. 340/556 |
| 8704259 | 7/1987 | WIPO . | |
| 8800745 | 1/1988 | WIPO ................ 340/555 |

*Primary Examiner*—Thomas Mullen

[57] ABSTRACT

The alleyway-monitoring device disclosed has, mounted at different heights, two light barriers (16 to 26, 28 to 30), the higher of which is at a height at which the light beam can be broken only by fork-lift trucks. The light barriers produce output signals which enable the direction of motion of the objects which break the beam to be determined, the output signals being passed to associated up/down counters (50, 52) which are in turn connected to the inputs of a monitoring circuit (54). The monitoring circuit triggers an acoustic alarm (56) if non-permitted counter-reading combinations occur.

10 Claims, 5 Drawing Sheets

DEVICE FOR MONITORING THE ALLEYWAYS BETWEEN SHELF UNITS IN A WAREHOUSE

FIELD OF THE INVENTION

The invention concerns an alleyway monitoring device.

BACKGROUND ART

In warehouses with high shelf units special fork-lift trucks have to be used to reach the higher shelves and to move heavier objects. It is easier to place smaller items onto and remove them from the shelves by hand. As the driver of a fork-lift truck often does not have an adequate view of the alleyway from behind the lift and the load there is the danger of collision between the fork-lift truck and persons doing manual order-picking work.

To avoid such accidents it has already been proposed to provide a barrier at the end of each alleyway which, in conjunction with a light barrier and associated electronics, guarantees that only one person or one truck can be in the alleyway at any time. Such barriers greatly impede work, however, because even when the alleyway is empty its opening must be awaited. This is why the personnel often disconnect such barriers so that they can work more quickly. Furthermore, with these known monitoring devices, access to the alleyway is not possible if a person doing manual order-picking work is in the alleyway and a second person, also working manually, wishes to enter the alleyway.

The risk of accidents in alleyways between shelf units could also be remedied in another way by, for example, providing for each fork-lift truck a monitoring device operating on the basis of ultrasound which monitors the space immediately in front of the truck for foreign objects. This possibility does, however, have the disadvantage that many false alarms are generated by other obstacles adjacent to the alleyway. The equipping of the various fork-lift trucks with a monitoring device of this kind also involves high costs.

SUMMARY OF THE INVENTION

The object of the invention is therefore to provide a monitoring device for an alleyway between shelf units which does not normally impede access to an alleyway but triggers an alarm if a non-permitted combination of fork-lift trucks and/or persons is present in the alleyway.

In the monitoring device according to the invention the distinction between persons and fork-lift trucks is made by two light barriers which are mounted at different heights. An upper light barrier operates at such a height that it can only be broken by the high fork-lift trucks. A lower light barrier is mounted at such a height that it can also be broken by persons walking in the alleyway. Both light barriers are so designed that they report not only the fact that they have been broken but also the direction of motion of the object breaking them. This can, for example, be achieved by means of two light barriers spaced apart in the longitudinal direction of the alleyway, whose output signals are evaluated via a suitable signal connection circuit. The output signals of the light barriers processed in this way can then be transmitted direct to an up/down counter whose counter reading directly corresponds to the number of fork-lift trucks in the alleyway and/or the number of objects in the alleyway (=trucks plus persons). A monitoring circuit supplied with the counter readings then generates, according to a pre-set table supplied to it, an alarm signal whenever a non-permitted combination "number of fork-lift trucks to number of objects" is determined.

The monitoring device according to the invention can also be installed in existing alleyways between shelf units with little technical outlay. Barriers and other obstacles which impede work are not required. Work in the alleyway is completely unimpeded until an alarm is triggered. In this case, which is not very frequent in practise, the driver of the fork-lift truck must then stop his truck until the alarm has been cancelled by an authorized person after the situation has been verified.

Advantageous further embodiments of the invention are disclosed as follows.

In a monitoring device using two light beams in wide alleyways it is also possible separately to detect two persons entering or leaving an alleyway alongside each other.

A monitoring device a lower light barrier and a third light barrier makes it possible to differentiate between persons walking behind each other and persons carrying an object in front of them.

The embodiment of the invention using a fourth light barrier also permits differentiation between a person and an order-picking trolley being pushed by a person.

With the embodiment of the invention using an acoustic alarm a compulsory immobilization of the fork-lift trucks is obtained when hazard situations are detected.

With a monitoring device using display devices the fork-lift trucks and persons moving about in the shelf unit have a constant view of those alleyways for which there is currently potential access and those alleyways which are temporarily blocked for safety reasons.

The embodiment of the invention using calculated and displayed schedules makes it possible for the fork-lift trucks and persons carrying out order-picking work to be guided in the performance of the order-picking work assigned to them in such a way that there are only short waiting times at the alleyways that are blocked for safety reasons.

BRIEF DESCRIPTION OF THE DRAWINGS

The invention will be described below with the aid of embodiments and the accompanying drawings, where.

DESCRIPTION OF THE PREFERRED EMBODIMENTS

Figure 1:
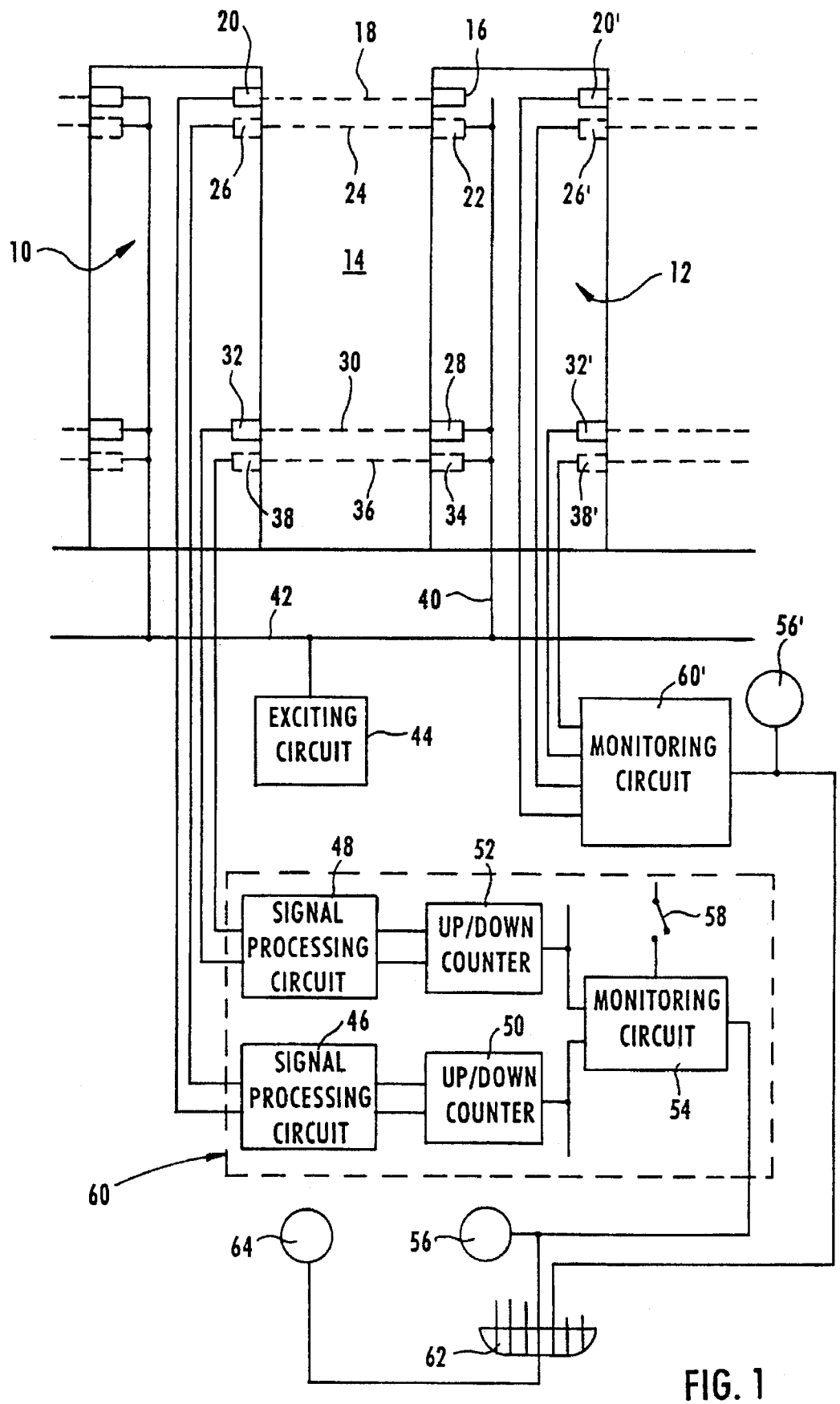
FIG. 1 shows a front view of two rows of a warehouse with high shelf units together with a block diagram of a monitoring device for alleyways between shelf units.

In FIG. 1, 10 and 12 show two rows of shelves in a warehouse with high shelf units, which have open shelves to the right and the left and an alleyway 14 in between.

A transmitter unit 16 which generates a light beam 18 is provided in the upper left-hand area of the shelf row 12. This light beam is picked up by a receiver unit 20 opposite, which is mounted in the upper right-hand section of the shelf row 10.

Lying behind the transmitter unit 16, and displaced slightly downwards for improved representation, a further transmitter unit 22 which generates a light beam 24 is provided. This impacts on a receiver unit 26 which is provided on the shelf row 10.

In the lower area of the alleyway 14 two further light barriers are similarly provided, which comprise a transmitter unit 28, a light beam 30, a receiver unit 32 as well as a transmitter unit 34, a light beam 36 and a receiver unit 38, the arrangement being similar to that of the two upper light barriers but with the sole difference that the light beams 30, 36 travel approximately at a height of 80 cm whereas the light beams 18, 24 travel at a height of approximately 2.20 m.

The transmitter units 16, 22, 28, 34 are connected via a line 40 to a feeder bar 42 which is supplied with pulsed direct current or alternating current from an exciting circuit 44, as is customary in light barriers for the electronic suppression of extraneous light.

The receiver units 20, 26 are connected to the inputs of a signal processing circuit 46, the outputs of the receiver units 32 and 38 correspondingly to the inputs of a signal processing circuit 48. Roughly speaking the two signal processing circuits 46, 48 operate in such a way that they determine from the time sequence of the breaking of the light beams whether the object breaking the light beams 18, 24 or the light beams 30, 36 is moving into or out of the alleyway. As appropriate the signal processing circuits 46, 48 provide at their one output a directional signal which is transmitted to the "+/−" control terminal of an associated up/down counter 50 or 52, the counter terminal "C" of which receives a counting pulse whenever the corresponding pair of light beams is broken.

In this way the reading on the up/down counter 50 corresponds to the number of fork-lift trucks in the alleyway. The reading of the up/down counter 52 corresponds to the total number of moving objects in the alleyway (fork-lift trucks plus persons).

A monitoring circuit 54 which evaluates the two counter readings is connected to the outputs of the up/down counters. By deducting the reading of the up/down counter 50 from the reading of the up/down counter 52 the monitoring circuit 54 determines the number of persons in the alleyway who break only the lower light beams 30, 34 when entering and leaving the alleyway.

By means of appropriate programming a table which gives all the combinations of the readings of the up/down counters which are unacceptable for safety reasons is filed in the monitoring circuit 54. When a non-permitted counter reading combination of this kind is encountered the monitoring circuit 54 produces a signal at its output, via which an acoustic alarm 56 is switched on permanently. The alarm can only be switched off by operating a re-set switch 58 which is connected to the alarm interception circuit of the monitoring circuit 54 and can only be operated by an authorized person and is designed as a key switch, for example, for this purpose.

The entire monitoring circuit associated with the alleyway 14 is designated as 60 in FIG. 1. A similar monitoring circuit 60' is provided for the adjacent alleyway 14', which is similarly equipped with light barriers, as described above for the alleyway 14 (reference numbers with a coma).

The output signals of the different monitoring circuits 60, 60' etc. are combined by an OR circuit 62 which triggers an additional alarm 64 mounted in a central control room of the warehouse (the alarm 56 is spatially mounted in the alleyway 14).

Figure 2:
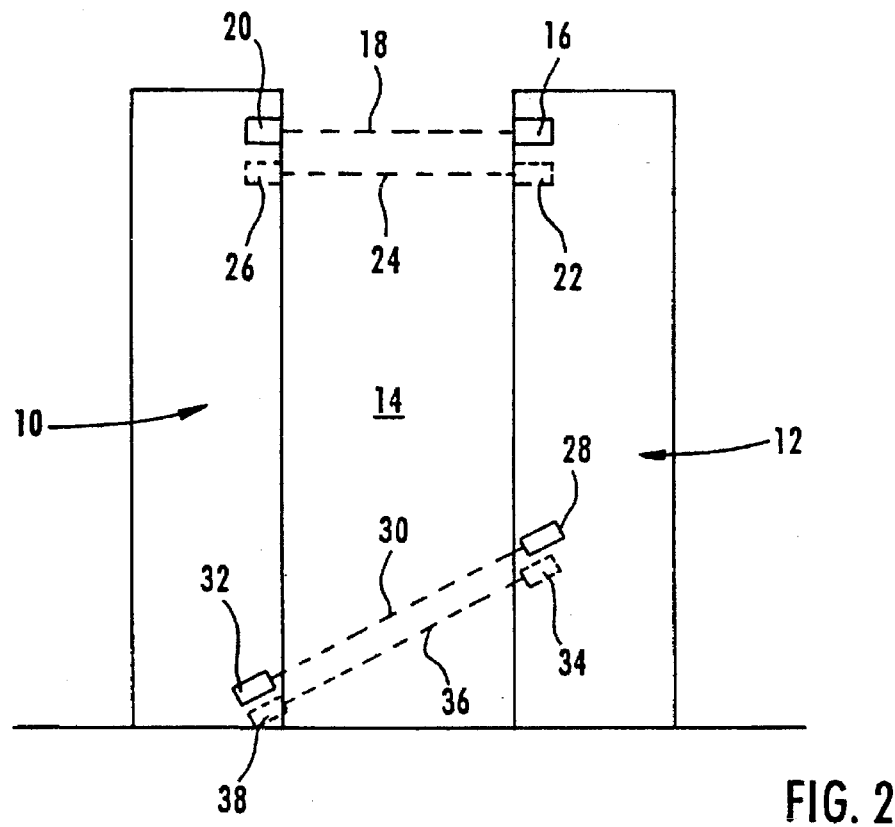
FIGS. 2 to 5 show modified geometries for the light barriers of the monitoring device for alleyways between shelf units according to FIG. 1.
Figure 3:
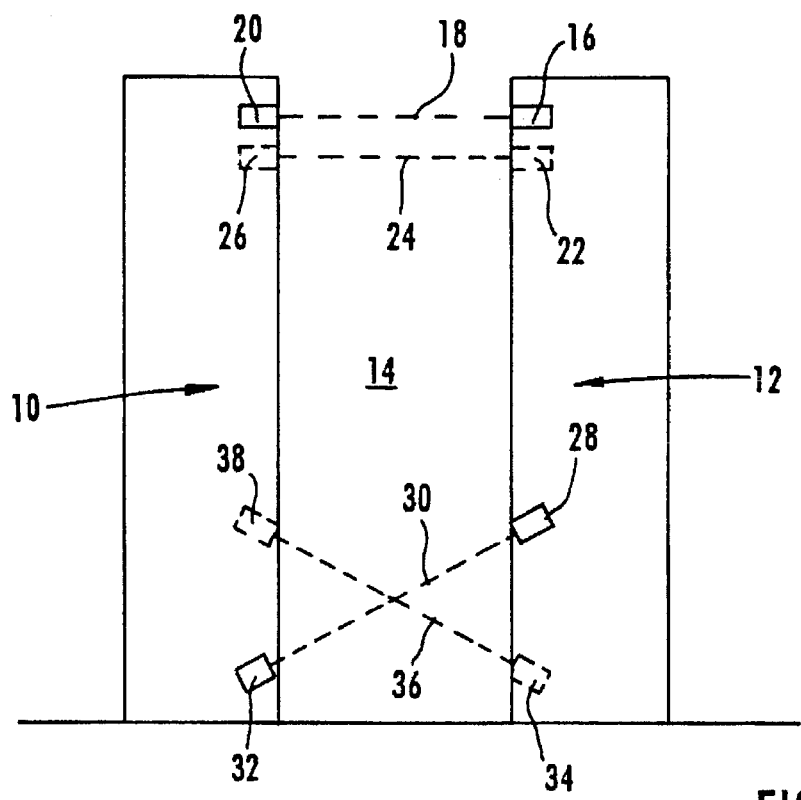

In the modified monitoring device according to FIG. 2 the lower light beams 30, 36 travel in a vertical plane inclined at an angle parallel to each other. In the embodiment as shown in FIG. 3 the light beams 30 and 36 are inclined in opposite directions and intersect in the center of the alleyway.

Figure 4:
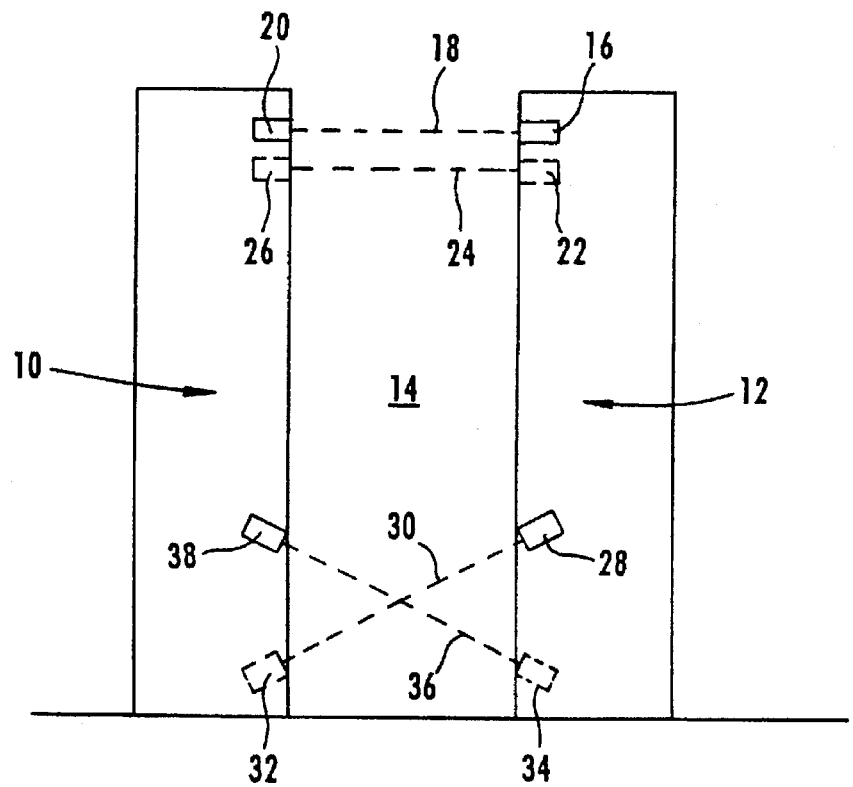

In the embodiment according to FIG. 4 the light beams 30 and 36 are both inclined in a direction perpendicular to the plane of the drawing. The two light beams 30, 36 are therefore broken at exactly the same time by two persons entering the alleyway next to one another or two persons leaving the alleyway next to each other at the same time, and the monitoring circuit 54 can distinguish this situation from the successive breaking of the light beams 30, 36 as caused by a single person.

Figure 5:
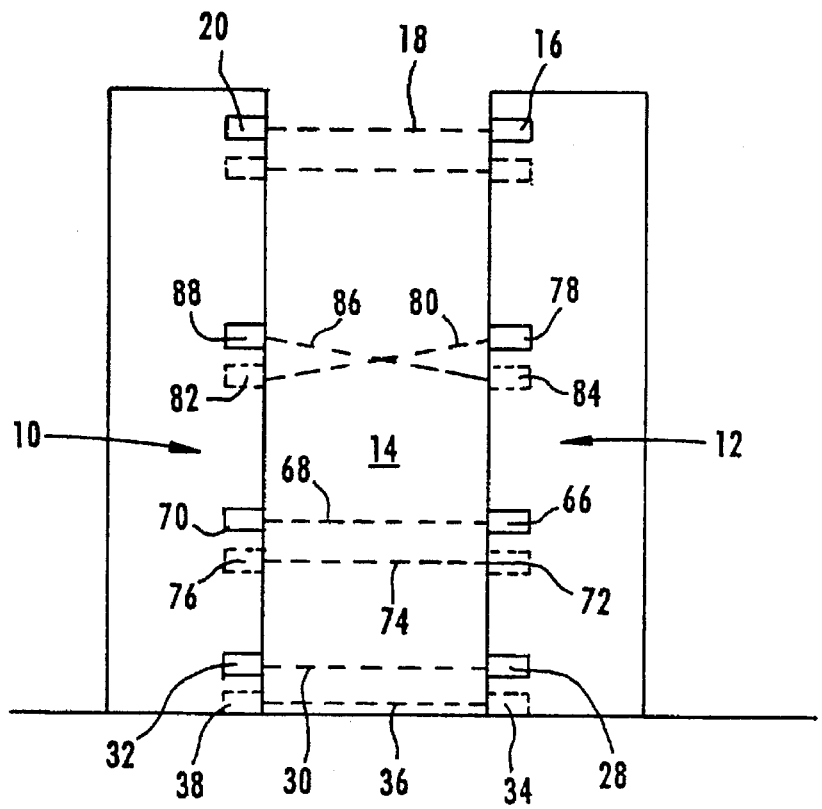

In the embodiment according to FIG. 5 the lower light beams 30, 36 are moved immediately adjacent to the floor of the alleyway, are 5 cm above the floor, for example. Additionally a center light barrier is provided at a height of approximately 80 cm which comprises the transmitter unit 66, the light beam 68 generated by this, the associated receiver unit 70 and the transmitting unit 72, the light beam 74 generated by this and the associated receiver unit 76.

A fourth light barrier is provided at a height of approx. 1.55 m and similarly comprises a transmitter unit 78, the light beam 80 generated by this, the associated receiver unit 82 and a transmitter unit 84, the light beam 86 generated by this and an associated receiver unit 88. The light beams 80, 86 again have a component travelling perpendicular to the plane of the drawing, so that they intersect in plan view, so that a clear resolution of persons walking next to one another is obtained in the neck or head area (depending on the height of the persons).

The additional light barriers are again connected to associated signal processing circuits and associated up/down counters. The outputs of these up/down counters are additionally connected to the monitoring circuit 54. This can therefore undertake an even finer resolution of the height of the passing objects and therefore additionally distinguish between a person and objects carried by a person and/or an order-picking trolley pushed by a person.

In the embodiments described above, for the purposes of the description and for reasons of simplicity it was assumed that the alleyway 14 is sealed off at the rear end by a wall or similar. If the alleyway can also be entered or left at the rear end or at a place at the side, similar light barriers are provided there, as in the end shown in FIG. 1. Signal processing circuits like the signal processing circuits designated as 46 and 48 in FIG. 1 are then associated with these light barriers. The output signals of the signal processing circuits associated with the further rear and/or lateral light barriers can either be transmitted to separate up/down counters associated with them which are then also connected to the monitoring circuit 54 which then determines the number of objects, persons and fork-lift trucks by comparing the various counter readings. Alternatively the outputs of the light barriers at the same height for the front and rear alleyway end and lateral accesses can be combined via an OR circuit and transmitted to a single up/down counter associated with this monitoring height.

The output signals of the up/down counters 50, 52 for the different alleyways can also be used to indicate in advance to the fork-lift trucks and the persons moving about in the warehouse which alleyways they can enter and which are currently blocked for safety reasons.

For this purpose the output signals of the up/down counters 50, 52 of an alleyway under consideration are additionally transmitted to adders 90, 92. The second input of the adder 92 permanently receives a signal which corresponds to the digital representation of the number "1". The second input of the adder 90 is supplied with the signal "1" via a controllable switch 94. When the switch 94 is closed, numbers which would correspond to the reading of the up/down counters 50, 52 if a further fork-lift truck had moved into the alleyway under consideration are obtained at the outputs of the adders 90, 92. If the switch 94 is open, the numbers obtained at the outputs of the adders 90, 92 correspond to a reading which would be obtained if a further person had moved into the alleyway under consideration.

The output signals of the adders 90, 92 are transmitted to a monitoring circuit 96 which is similarly constructed to the monitoring circuit 54 and supplies an alarm signal at its output if an alarm condition were to be obtained because of the additional entry of a fork-lift truck (switch 94 closed) or additional entry of a person into the alleyway (switch 94 open).

The monitoring circuit formed by the adders 90, 92 and the monitoring circuit 96 is designated as a whole by 98. Like the output signals of further monitoring circuits 98' and 98" for further alleyways, its output signal is transmitted to inputs of a control computer 100. This operates in conjunction with an in/output unit 102 into which the various order-picking tasks are inputted as well as the fork-lift trucks and persons to be employed for these tasks.

Periodically the control computer 100 evaluates the accessible and blocked alleyways for the various fork-lift trucks and persons, opening (person) or closing (fork-lift truck) the switch 94 depending on the object to be simulated.

For the fork-lift trucks and order-picking persons the control computer 100 has an associated modem 104 on the output side which cooperates with a modem 106 set to the same frequency, which the order-picking person carries with him or which is mounted on the corresponding fork-lift truck. Such a truck is illustrated diagrammatically as 108 in FIG. 6.

The modem 106 is connected to a display unit 110. Via the modems 104 and 106 the control computer 100 continuously represents on the display unit 110 which alleyways are currently blocked for safety reasons and which are accessible.

Taking into account the currently freely accessible alleyways, the order-picking work to be carried out and the instructions already passed to other fork-lift trucks and persons the control computer 100 can also compile a schedule for an order-picking person or a fork-lift truck providing no or only short waiting times at blocked alleyways.

Figure 6:
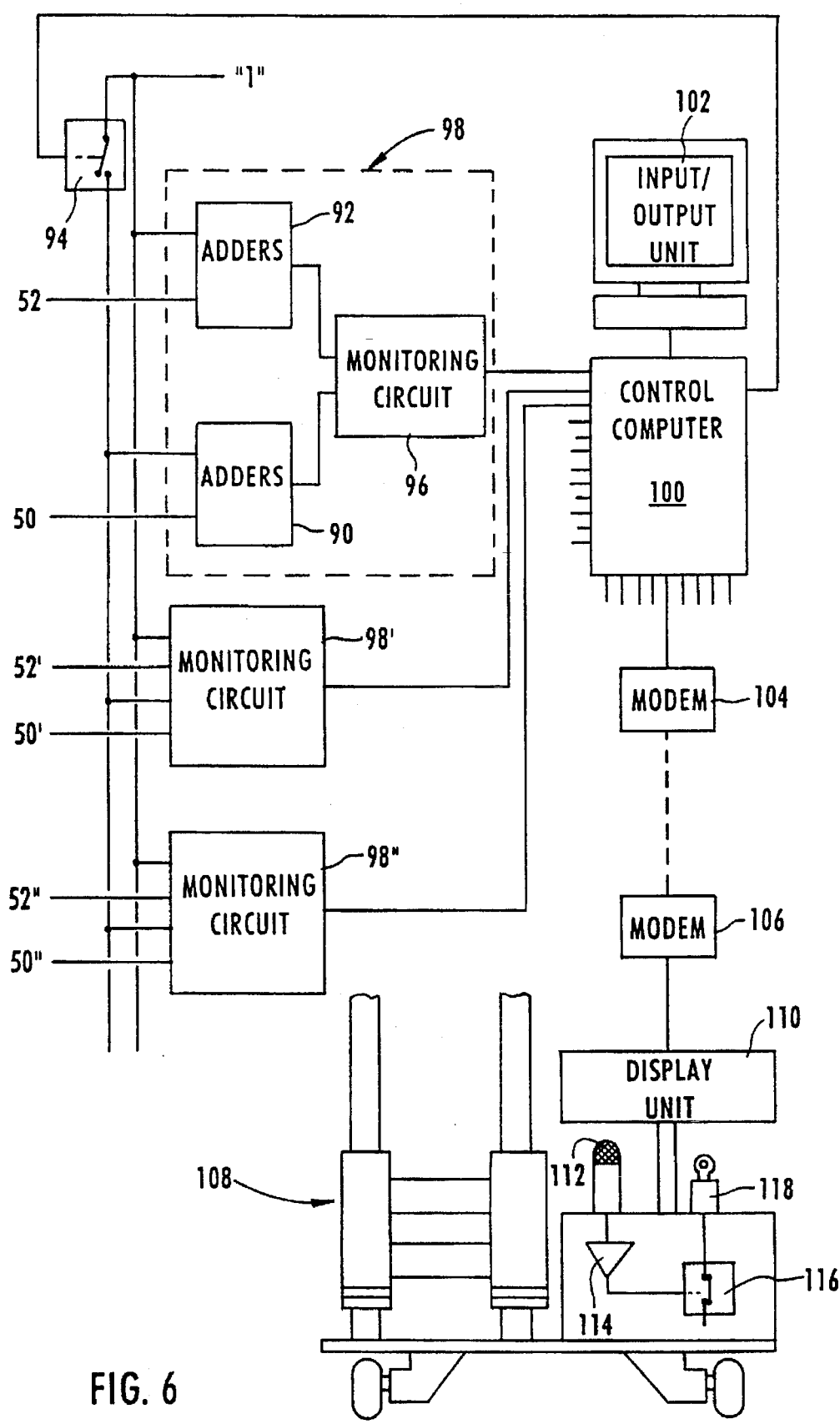
FIG. 6 shows a block diagram of a control center of a warehouse with high shelf units together with a fork-lift truck.

As FIG. 6 shows, the fork-lift truck 108 also carries a microphone 112 which via an amplifier 114 can open a controllable and usually closed emergency stop switch 116 which is connected in series with the normal key switch 118 of the truck.

Figure 7:
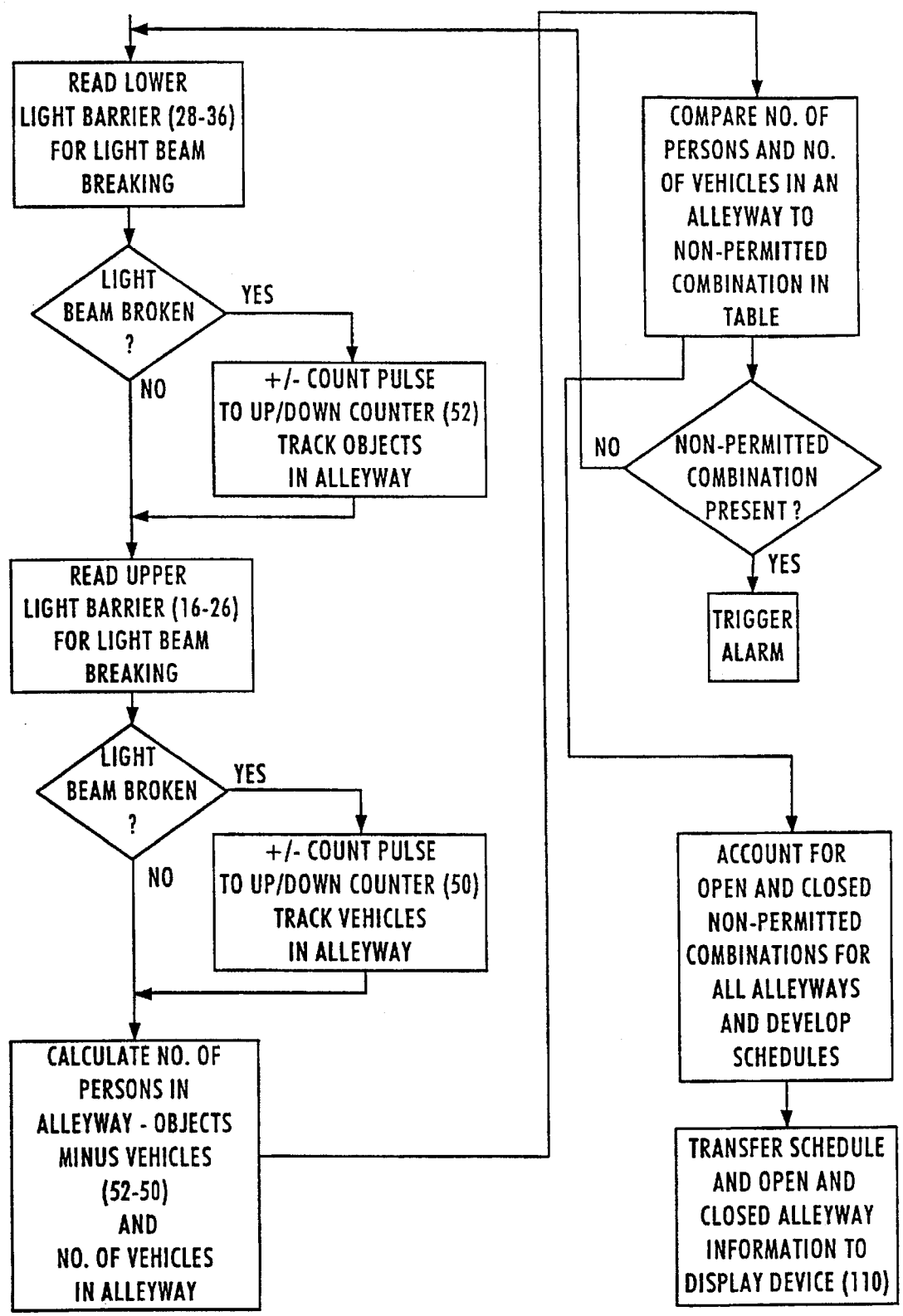
FIG. 7 is a flow chart detailing the function of the up/down counters 50 and 52 and determination of a non-permitted situation by the computer 100.

FIG. 7 is a flow chart detailing the functions of the up/down counters 50 and 52, the determination of a non-permitted combination to trigger the alarm 56 and the transfer of information from the control computer 100 to the display device 110. As is evident from FIG. 7, the up/down counters 52 and 50 track the objects and vehicles in the alleyway. With this information, the number of persons in the alleyway can be calculated by subtracting the number of sensed vehicles from the number of sensed objects.

Then, the number of persons and number of vehicles in an alleyway is compared to a non-permitted combination in a table which gives combinations of the number of persons and number of vehicles in an alleyway which would be unacceptable for safety reasons. For example, if a fork-lift truck entered an alleyway, the computer 100 can compare the number of persons and number of vehicles for each alleyway to determine which alleyways are blocked or have a non-permitted combination of persons and vehicles. Based on this evaluation, the computer can compile a schedule for the display device 110 associated with a fork-lift truck or person so that the fork-lift truck or person only has to wait a short time at alleyways that may be blocked.

I claim:

1. A monitoring device for an alleyway defined by a pair of upstanding structures, the alleyway having at least one accessible end, comprising:

at least two light barrier assemblies (16 to 26, 28 to 38) mounted at a first height level and a second height level, respectively, on said pair of upstanding structures at said at least one accessible end, each of said light barrier assemblies supplying an output signal responsive to an object breaking light beams formed by said light barrier assembly, the output signal being based on the particular sequence of breaking of the light beams of said light barrier assembly, the sequence being based on a direction of motion of the object which breaks the light beams; an up/down counter (50, 52) for each of said light barrier assemblies, each up/down counter being supplied with the output signals of its associated one of said light barrier assemblies (16 to 26, 28 to 38); and a monitoring circuit (54) being connected to output signals of the up/down counters (50, 52), said monitoring circuit (54) supplying an alarm signal whenever said monitoring circuit (54) determines a pre-set combination of readings of said up/down counters (50, 52).

2. Monitoring device as claimed in claim 1, wherein at least one of said at least two light barrier assemblies (28 to 38) has two light beams (30, 36) inclined with respect to the vertical in a vertical plane.

3. Monitoring device as claimed in claim 1, wherein at least one of said at least two light barrier assemblies (28 to 38) has two light beams (30, 36) inclined in opposite directions with respect to vertical.

4. Monitoring device as claimed in claim 1, wherein at least one of said at least two light barrier assemblies (28 to 38) has two parallel light beams (30, 36) each being inclined with respect to horizontal and intersecting along a longitudinal center plane of the alleyway (14).

5. Monitoring device as claimed in claim 1, wherein said first height level is immediately adjacent to a floor of the alleyway (14), and a third light barrier assembly (66 to 76) is provided at a third height level between said first and second height levels.

6. Monitoring device as claimed in claim 5, further comprising a fourth light barrier assembly (78 to 80) being provided at a height that is between the second height level and the third height level.

7. Monitoring device as claimed in claim 1, wherein an acoustic alarm (56) generates said alarm signal, said acoustic alarm being triggered by the monitoring circuit (54).

8. Monitoring device as claimed in claim 1, further comprising a re-set switch (58) associated with the monitoring circuit (54), said re-set switch operable to interrupt said alarm signal.

9. Monitoring device as claimed in claim 1, wherein a plurality of monitoring devices (60, 60') are used with a plurality of alleyways, and a single central alarm (64) is triggered by any one of said monitoring circuits of said plurality of monitoring devices (60, 60').

10. Monitoring device as claimed in claim 7, wherein fork-lift trucks are provided with a microphone responding to the signals of the acoustic alarm (56), the microphone used to switch off all movement functions of the fork-lift truck upon receiving the signals from the acoustic alarm.

* * * * *